3,485,644
HIGH STRENGTH CERAMIC-LIKE ARTICLE CONTAINING ALPHA QUARTZ AS THE MAJOR CRYSTAL PHASE
Francis J. Shonebarger, Lancaster, Ohio, assignor to Anchor Hocking Corporation, Lancaster, Ohio, a corporation of Delaware
No Drawing. Filed Nov. 12, 1965, Ser. No. 507,567
Int. Cl. C04b 33/16
U.S. Cl. 106—39          11 Claims

ABSTRACT OF THE DISCLOSURE

A ceramic article produced by the controlled divitrification of a glass consisting essentially of about 55.0 to 66.0% by weight $SiO_2$, 9.0 to 23% by weight $Al_2O_3$, 8.5 to 13.7% by weight MgO, 1.0 to 7.0% by weight $B_2O_3$, 1.0 to 6.0% by weight $TiO_2$, and 2.0 to 2.75% by weight $ZrO_2$. The article produced contains alpha quartz as the major crystalline phase.

---

This invention relates to the production of ceramic-like articles by the controlled devitrification of vitreous articles and more particularly it relates to a method for producing high-strength, ceramic-like articles having desirable coefficients of thermal expansion.

Controlled devitrification of vitreous articles has been practiced since Reaumur devitrified wine bottles in the early 1700's. In recent years more modern technology has made it possible to commercially produce ceramic-like articles, which can withstand severe temperature changes, from vitreous articles.

More recently, remarkably high strength ceramic-like products have been produced from vitreous articles. Such high strength articles are shown in Henry et al. U.S. Patent No. 3,117,881. These articles are produced from vitreous base compositions which upon being completely or almost completely devitrified will yield a predominant crystalline phase of cordierite, mullite, sapphirine or tridymite. In this process at least 6% of a primary nucleating agent $ZrO_2$, and about 1.5% of a secondary nucleating agent are employed.

Ceramic-like articles having a minor crystalline phase of quartz are shown in Stookey U.S. Patent No. 2,971,853. Such articles are produced from a base composition comprised of $Li_2O$, $Al_2O_3$ and $SiO_2$ by using a photosensitive nucleating agent.

Heretofore, it has not been possible to produce ceramic-like articles having a major crystalline phase of quartz through the use of non-photosensitive nucleating agents from a glass consisting predominantly of MgO, $Al_2O_3$ and $SiO_2$.

The present invention provides a high strength ceramic-like article having a major crystalline phase of alpha-quartz, of varying degrees of purity, produced from a glass consisting predominantly of MgO, $Al_2O_3$ and $SiO_2$.

It has been found that the coefficient of thermal expansion of the present ceramic-like article can be controlled within broad ranges by varying the heat treatment rendering them especially suitable for tableware. This property permits one to control the strain in the article and in an applied glaze.

One important advantage of being able to control the coefficient of thermal expansion is that conventional glazes can be applied to the tableware articles made from my ceramic-like article. This has not heretofore been possible with many of the previous ceramic-like articles produced by devitrifying glasses because the coefficients of thermal expansion of the ceramic-like articles have not coincided with those of the available glazes and, consequently, when the glazed ware was fired and cooled, cracking occurred, or, when the glaze was fired the article deformed.

Unlike prior methods utilized to produce ceramic-like articles from virteous compositions, such as those referred to above, the present method does not seek to produce a product which is completely or almost completely crystalline. Through X-ray diffraction analyses, which can at best provide only a rough approximation of the crystal content of a devitrified article, I have found that articles produced in accordance with the present invention contain less than about 40% by volume of alpha-quartz. Alpha-quartz is the major crystalline phase present, that is, it is always present in an amount greater than any other crystalline phase and usually in an amount substantially greater than any other crystalline phase.

My invention consists of heat treating a vitreous composition which includes, on an oxide basis, about 55.0 to 66.0% by weight $SiO_2$, 9.0 to 23.0% by weight $Al_2O_3$, 8.5 to 13.0% by weight MgO, 1.0 to 7.0% by weight $B_2O_3$, 1.0 to 6.0% by weight $TiO_2$, and 2.0 to 5.75% by weight $ZrO_2$ to provide a ceramic-like material which contains alpha-quartz as the major crystalline phase.

The ceramic-like materials so formed, which contain alpha-quartz as a major crystalline phase, have a modulus of rupture ranging from about 30,000 p.s.i. to about 180,000 p.s.i. The coefficients of thermal expansion ranges between about $34 \times 10^{-7}/°$ C. and $125 \times 10^{-/°}$ C. The modulus of rupture and the coefficient of thermal expansion can be varied by the heat treatment and the composition.

I have found that surprisingly a ceramic-like article containing alpha-quartz as a major crystalline phase can be produced from a vitreous article consisting essentially of MgO, $Al_2O_3$ and $SiO_2$ only when $B_2O_3$, $ZrO_2$ and $TiO_2$ are present in amounts to be more fully set forth below.

Although the exact mechanism by which alpha-quartz is produced as a major crystalline phase and the reason why $B_2O_3$, $ZrO_2$ and $TiO_2$ are all essential is unknown, it believed that the phenomenon of short-range-order phase separation is involved. It is believed that when $B_2O_3$ is used with the present compositions, a metastable condition is produced in the glass and that only thereafter can alpha-quartz be crystallized through the combined use of $TiO_2$ and $ZrO_2$.

The presence of $TiO_2$ and $ZrO_2$ is necessary to crystallize an alpha-quartz crystalline phase which is responsible for the unique properties of my ceramic-like article. If either the $TiO_2$ or the $ZrO_2$ is omitted, alpha-quartz can not be crystallized upon heat treatment.

Not only is the effect of the metastable condition necessary for the subsequent crystallization of the alpha-quartz, but it also prevents deformation of the glass article during the controlled heat treatment of the ware to mature a glaze or a decoration. Additionally, the result of the metastable condition contributes to the opaqueness of the articles.

The glass batches from which the present ceramic articles may be produced can be compounded from ordinary glass making ingredients. Conventional glass melting and forming techniques and apparatus can likewise be employed in the fabrication of articles from the glass.

Table I shows five compositions which can be heat treated to produce a ceramic-like article having an alpha-quartz crystalline phase.

From the batch material shown in Example 1, a glass batch was compounded and melted to give a glass having an oxide analysis identical to that shown as Example 1. The batch melted readily at 2700° F. After melting, a rod was drawn from the glass. The rod was cooled to room temperature and reheated to 1800° F. at the rate of 100° F. per hour and held for one-half hour. It was then cooled to room temperature.

The ceramic-like rod so produced was white and opaque. Examination by X-ray diffraction, using the techniques set forth in Klug and Alexander "X-Ray Diffraction Procedures," disclosed the presence of alpha-quartz. Thermal expansion tests performed on the rod confirmed the presence of alpha-quartz by the characteristic inversion of quartz.

The strength of the rod, which was about .12 inches in diameter, was determined by a conventional three point loading technique and was found to be about 46,500 p.s.i.

Glass rods were produced from the glass compositions of Examples 2–5. The rods from Examples 2, 3, and 4 were heat treated at 1800° F. for one-half hour, and the rod from Example 5 was heat treated at 1700° F. for two hours. X-ray diffraction analyses showed the presence of alpha-quartz. The strengths analyses showed the presence of alpha-quartz. The strengths of the rods ranged from 34,800 to 125,100 p.s.i.

The deformation of the rods during the crystallization heat treatment was measured by observing the angular deviation from the horizontal which had occurred in an unsupported three-quarters of an inch of the rod. As can be seen from Table I, the rods did not deform during the heat treatment.

TABLE I

| Batch Material | Ex. 1 | Ex. 2 | Ex. 3 | Ex. 4 | Ex. 5 |
| --- | --- | --- | --- | --- | --- |
| Powdered flint | 2,000 | 2,110 | 2,000 | 2,070 | 1,929 |
| Boric acid | 282.5 | 115 | 115 | 115 | 115 |
| Magnesite | 426.5 | 450 | 378 | 307 | 307 |
| Hydrated alumina | | | | 999 | 1,105 | 1,211 |
| Calcined alumina | 350.7 | 472.5 | | | |
| Titania | 127.0 | 134 | 134 | 134 | 134 |
| Zircon | 174.9 | 184.5 | 184.5 | 184.5 | 184.5 |
| Red Lead | | | | 110.6 | |

| Oxide content | Ex. 1 | Ex. 2 | Ex. 3 | Ex. 4 | Ex. 5 |
| --- | --- | --- | --- | --- | --- |
| $SiO_2$ | 63.53 | 63.45 | 58.78 | 61.41 | 58.59 |
| $B_2O_3$ | 4.86 | 1.88 | 1.83 | 1.85 | 1.89 |
| $Fe_2O_3$ | 0.07 | 0.08 | 0.04 | 0.04 | 0.04 |
| $TiO_2$ | 3.88 | 3.89 | 3.78 | 3.83 | 3.91 |
| $Al_2O_3$ | 10.85 | 13.86 | 18.36 | 20.50 | 22.94 |
| CaO | 0.16 | 0.16 | 0.13 | 0.11 | 0.11 |
| MgO | 12.97 | 13.00 | 10.53 | 8.69 | 8.88 |
| $ZrO_2$ | 3.63 | 3.64 | 3.54 | 3.58 | 3.66 |
| $Na_2O$ | 0.04 | 0.06 | | | |
| PbO | | | 3.0 | | |
| Melting Temp. °F | 2700 | 2700 | 2600 | 2700 | 2700 |
| Strength, p.s.i. | 46,500 | 34,800 | 40,600 | 125,100 | 80,000 |
| Expansion (100 to 600 °F.) | 73.3×10⁻⁷ | | | | |
| Deformation, deg. | 0 | 0 | 0 | 0 | 0 |

It has been found that the heat treatment given to the formed article affects the physical properties of the finished article. The heating rate during the crystallizing cycle should be within the range of about 33° F. per hour to 300° F. per hour when the rods are being reheated above 1300° F. The maximum crystallizing temperature should be below 1900° F. The article may be held up to two hours at the maximum crystallizing temperature.

Tables II and III show the results of subjecting rods made from the compositions of Example I to various heating rates and holding periods.

TABLE II

| Heating rate, ° F. per hour to 1,800° F., 1 hour | Coefficient thermal expansion 1° C. (×10⁻⁷) 100–600° F. | Strength, p.s.i. |
| --- | --- | --- |
| 300 | 41.6 | 32,600 |
| 200 | 58.0 | 34,800 |
| 100 | 90.5 | 41,300 |
| 3⅓ | 111.2 | 53,500 |

TABLE III

| Maximum crystallizing temperature (100° F. per hour heat up rate) | Time held (hr.) | Coeff. therm. exp. 1° C. (×10⁻⁷) (100–600° F.) | Strength, p.s.i. |
| --- | --- | --- | --- |
| 1,770 | None | 43.8 | 30,400 |
| 1,800 | None | 51.8 | 28,000 |
| 1,800 | ¼ | 67.3 | 53,800 |
| 1,800 | ½ | 73.3 | 46,500 |
| 1,800 | 1 | 90.5 | 41,300 |

It can be seen from Table II that as the heating rate is increased, the coefficient of thermal expansion and the strength decrease. Likewise, it can be seen from Table III that as the holding time at the maximum crystallizing temperature is increased, the coefficient of thermal expansion increases.

$TiO_2$, $ZrO_2$ and $B_2O_3$ must be present in certain amounts in order to obtain crystals of alpha quartz.

Table IV contains five examples of glasses having a MgO, $Al_2O_3$ and $SiO_2$ content within the ranges of the present invention but which include only $TiO_2$, $TiO_2$ with $B_2O_3$, or $TiO_2$ with $ZrO_2$.

TABLE IV

| Oxide | Ex. 6 | Ex. 7 | Ex. 8 | Ex. 9 | Ex. 10 |
| --- | --- | --- | --- | --- | --- |
| $SiO_2$ | 62.25 | 59.82 | 61.32 | 63.81 | 66.78 |
| $B_2O_3$ | | | 3.21 | 3.35 | |
| $Fe_2O_3$ | 0.04 | 0.04 | 0.07 | 0.07 | 0.07 |
| $TiO_2$ | 6.11 | 9.77 | 11.55 | 8.02 | 4.08 |
| $Al_2O_3$ | 22.12 | 21.25 | 10.77 | 11.15 | 11.40 |
| CaO | 0.11 | 0.11 | 0.16 | 0.16 | 0.17 |
| MgO | 9.38 | 9.01 | 12.88 | 13.40 | 13.63 |
| $ZrO_2$ | | | | | 3.82 |
| $Na_2O$ | | | 0.04 | 0.04 | 0.05 |
| Heat Treatment, °F. | 0–1,700 | 0–1,700 | 0–1,800 | 0–1,800 | 0–1,800 |

Rods made from Examples 8–10 were subjected to X-ray diffraction analyses after they were heat treated. They did not produce an X-ray trace corresponding to alpha-quartz. None of the rods from these examples possessed the combined properties of strength, coefficient of thermal expansion, low deformation characteristic, opaqueness and the white color of the ceramics produced according to my invention.

It has also been found that to produce a ceramic having a major crystal phase of alpha-quartz that not only must $ZrO_2$, $B_2O_3$ and $TiO_2$ be present but they must be present in certain amounts.

Table V shows four glasses having a $B_2O_3$ content of from 1.67 to 7.69 weight percent. The ratios of the concentrations of the $ZrO_2$, $TiO_2$, $Al_2O_3$, MgO and $SiO_2$ remain constant. Only the $B_2O_3$ varies. Examples 1 and 10 should also be included as examples in Table V.

TABLE V

| Oxide | Ex. 11 | Ex. 12 | Ex. 13 | Ex. 14 |
| --- | --- | --- | --- | --- |
| $SiO_2$ | 65.66 | 64.58 | 62.57 | 61.64 |
| $B_2O_3$ | 1.67 | 3.30 | 6.30 | 7.69 |
| $Fe_2O_3$ | 0.07 | 0.07 | 0.07 | 0.07 |
| $TiO_2$ | 4.01 | 3.94 | 3.82 | 3.76 |
| $Al_2O_3$ | 11.21 | 11.03 | 10.69 | 10.53 |
| CaO | 0.16 | 0.16 | 0.16 | 0.15 |
| MgO | 13.41 | 13.19 | 12.78 | 12.59 |
| $ZrO_2$ | 3.75 | 3.69 | 3.58 | 3.52 |
| $Na_2O$ | 0.04 | 0.04 | 0.04 | 0.04 |

The rods produced from the glasses were crystallized by heating them to 1800° F. for about ½ hour. Only Examples 1, 11 and 12 contained alpha-quartz as a major crystalline phase. Even though the $B_2O_3$ level can be raised to slightly above 6% when the $ZrO_2$ and $TiO_2$ contents are raised, it has been found that more than 7% greatly inhibits or altogether prevents the formation of alpha-quartz crystals.

Table VI shows three glasses having varying amounts of $ZrO_2$ but otherwise they are substantially identical. Example 1 could also be included in this table.

TABLE VI

| Oxide | Ex. 15 | Ex. 16 | Ex. 17 |
|---|---|---|---|
| $SiO_2$ | 63.08 | 62.64 | 62.21 |
| $B_2O_3$ | 4.79 | 4.72 | 4.65 |
| $Fe_2O_3$ | 0.07 | 0.07 | 0.07 |
| $TiO_2$ | 3.82 | 3.77 | 3.71 |
| $Al_2O_3$ | 10.69 | 10.53 | 10.38 |
| CaO | 0.16 | 0.15 | 0.15 |
| MgO | 12.78 | 12.59 | 12.41 |
| $ZrO_2$ | 4.57 | 5.48 | 6.38 |
| $Na_2O$ | 0.04 | 0.04 | 0.04 |

Rods drawn from these glasses and heat treated by heating to 1800° F. and holding for ½ hour showed a decrease in strength from 45,800 p.s.i. for the rod made from the glass of Example 1 to 26,600 p.s.i. for the rod made from Example 16. The rod made from the glass of Example 17 was not suitable for testing. If the $TiO_2$ content is increased as the $ZrO_2$ content is being increased, the decrease in strength is not as marked. However, more than about 5.75% $ZrO_2$ will generally precipitate when the glass is being melted.

Table VII shows six glass compositions which were melted, formed into rods and crystallized at 1800° F. for ½ hour to study the effect of varying the $TiO_2$ content and the $TiO_2$ and $ZrO_2$ content.

TABLE VII

| Oxide | Ex. 18 | Ex. 19 | Ex. 20 | Ex. 21 | Ex. 22 | Ex. 23 |
|---|---|---|---|---|---|---|
| $SiO_2$ | 63.94 | 63.32 | 62.30 | 59.99 | 63.48 | 62.44 |
| $B_2O_3$ | 3.26 | 3.23 | 3.18 | 3.06 | 3.22 | 3.14 |
| $Fe_2O_3$ | .07 | .07 | .07 | .07 | .07 | .07 |
| $TiO_2$ | 4.89 | 5.81 | 7.34 | 10.76 | 4.82 | 5.65 |
| $Al_2O_3$ | 10.92 | 10.81 | 10.64 | 10.25 | 10.76 | 10.50 |
| CaO | .16 | .16 | .16 | .15 | .16 | .15 |
| MgO | 13.06 | 12.93 | 12.72 | 12.25 | 12.86 | 12.55 |
| $Na_2O$ | 0.04 | 0.04 | 0.04 | 0.04 | 0.04 | 0.04 |
| $ZrO_2$ | 3.66 | 3.62 | 3.56 | 3.43 | 4.59 | 5.46 |

Rods made from the glasses of Examples 18, 19, 22 and 23 showed the presence of alpha-quartz upon X-ray diffraction examination while the rods made from the glasses of Examples 20 and 21 did not.

It was found that the $TiO_2$ content could slightly exceed 6% if the $ZrO_2$ content was also raised. However, no advantages were obtained by raising the $TiO_2$ content above 6%.

The glasses shown in Table VIII can also be crystallized to produce a useful ceramic-like article containing a major crystalline phase of alpha-quartz.

TABLE VIII

| Oxide | Ex. 24 | Ex. 25 | Ex. 26 | Ex. 27 | Ex. 28 | Ex. 29 |
|---|---|---|---|---|---|---|
| $SiO_2$ | 61.85 | 60.61 | 59.79 | 59.45 | 62.49 | 62.53 |
| $Al_2O_3$ | 21.33 | 20.90 | 21.36 | 22.46 | 14.88 | 16.91 |
| MgO | 9.04 | 8.86 | 9.06 | 8.69 | 13.01 | 10.97 |
| $B_2O_3$ | 1.92 | 1.88 | 1.93 | 1.85 | 1.88 | 1.88 |
| $ZrO_3$ | 3.73 | 3.65 | 3.73 | 3.58 | 3.64 | 3.65 |
| $TiO_2$ | 1.98 | 3.95 | 3.99 | 3.83 | 3.89 | 3.90 |
| CaO | .11 | .11 | .11 | .11 | .16 | .13 |
| $Fe_2O_3$ | .04 | .04 | .04 | .03 | .05 | .04 |

When rods made from the glasses 24, 25 and 27 were heated to 1700° F. for two hours, alpha quartz was found to be the major crystalline phase formed. The rods were tested and found to have strengths ranging from 34,700 p.s.i. for the rod made from the glass of Example 24 to 148,300 p.s.i. for the rod made from the glass of Example 25.

Rods made from the glasses of Examples 26, 28 and 29 were heated to 1800° F. for ½ hour. A major crystalline phase of alpha quartz was found. The stengths of the rods measured in p.s.i. were respectively 185,700, 62,900 and 43,400.

Although the total amount of $SiO_2$, $Al_2O_3$ and MgO in the glass can below 85% by weight and the desired properties still obtainable, I have found that perferably these three oxides should compose at least 85% of the glass.

Lead oxide and/or zinc oxide up to about 5.0% can advantageously be added to promote the melting of the glasses. Other fluxes which can be used include $CaF_2$, LiF and $Li_2O$. I prefer to add the $Li_2O$ as a spodumene or petalite. Examples of such glasses are shown in Table IX.

TABLE IX

| Oxide | Ex. 30 | Ex. 31 | Ex. 32 | Ex. 33 |
|---|---|---|---|---|
| $SiO_2$ | 60.00 | 56.68 | 59.40 | 58.23 |
| $Al_2O_3$ | 18.74 | 19.55 | 20.49 | 20.08 |
| MgO | 10.75 | 8.29 | 8.69 | 8.51 |
| $B_2O_3$ | 1.86 | 5.29 | 1.85 | 1.81 |
| $ZrO_2$ | 3.61 | 3.41 | 3.58 | 3.51 |
| $TiO_2$ | 3.86 | 3.65 | 3.82 | 3.75 |
| CaO | .13 | .10 | .11 | .10 |
| $Fe_2O_3$ | .04 | .03 | .03 | .03 |
| PbO | 1.00 | 3.00 | | |
| ZnO | | | 2.04 | 3.97 |

| Oxide | Ex. 34 | Ex. 35 | Ex. 36 | Ex. 37 |
|---|---|---|---|---|
| $SiO_2$ | 36.80 | 64.07 | 64.56 | 64.69 |
| $B_2O_3$ | 4.06 | 4.08 | 3.29 | 3.30 |
| $Fe_2O_3$ | 0.07 | .11 | .14 | .04 |
| $TiO_2$ | 3.90 | 3.91 | 3.94 | 3.95 |
| $Al_2O_3$ | 10.88 | 10.93 | 11.02 | 11.03 |
| CaO | 0.11 | 0.11 | 0.12 | 0.10 |
| MgO | 13.02 | 12.09 | 11.66 | 12.70 |
| $Na_2O$ | 0.05 | 0.06 | 0.06 | 0.04 |
| $ZrO_2$ | 3.58 | 3.60 | 3.63 | 3.63 |
| $K_2O$ | 0.02 | 0.04 | 0.06 | |
| $Li_2O$ | 0.50 | 1.00 | 1.51 | |
| LiF | | | | 0.50 |

| Oxide | Ex. 38 | Ex. 39 | Ex. 40 | Ex. 41 |
|---|---|---|---|---|
| $SiO_2$ | 64.69 | 64.70 | 64.61 | 64.70 |
| $B_2O_3$ | 3.30 | 3.30 | 3.30 | 3.30 |
| $Fe_2O_3$ | 0.04 | 0.04 | 0.04 | 0.03 |
| $TiO_2$ | 3.95 | 3.95 | 3.95 | 3.95 |
| $Al_2O_3$ | 11.03 | 11.03 | 11.17 | 11.06 |
| CaO | 0.10 | 0.09 | 0.09 | 0.07 |
| MgO | 12.20 | 11.20 | 11.18 | 9.19 |
| $Na_2O$ | 0.04 | 0.04 | 0.04 | 0.04 |
| $ZrO_2$ | 3.64 | 3.64 | 3.63 | 3.63 |
| LiF | 1.01 | 2.01 | | |
| $CaF_2$ | | | 2.00 | 4.00 |

Rods made from the glasses of Examples 30 and 34–41 were heated to 1800° F. and held for ½ hour and rods made from the glasses of Examples 31, 32 and 33 were heated to a peak temperature of 1700° F. A major crystalline phase consisting of alpha-quartz was detected in each rod. The strengths of the rods varied from a low of 40,700 p.s.i. to a high of 153,300 p.s.i.

It has been stated earlier that conventional glass making apparatus and batch materials may be utilized in the practice of this invention. Due to the volatility of $B_2O_3$, the $B_2O_3$ content of the synthesized article is dependent upon the melting technique and the content may vary even though the amount added to the batches is identical. For instance, the glasses of Examples 1 and 12 were melted by a technique different from the other examples. It was found that the ceramic-like articles produced from these two glasses had an analyzed $B_2O_3$ content of about 1% less than the calculated amount while the others had an analyzed content approximately equal to their calculated content. It should therefore be understood that the $B_2O_3$ ranges specified herein refer to analyzed percentages.

Having thus described my invention, I claim:

1. A ceramic-like article produced by the controlled thermal devitrification of a glass consisting essentially of 55.0 to 66.0% by weight $SiO_2$, 9.0 to 23.0% by weight $Al_2O_3$, 8.5 to 13.7% by weight MgO, 1.0 to 7.0% by weight $B_2O_3$, 1.0 to 6.0% by weight $TiO_2$, and 2.0 to 5.75% by weight $ZrO_2$, said article containing alpha-quartz as the major crystalline phase.

2. The ceramic-like article of claim 1 wherein said glass includes 1 to 5.0% by weight of at least one flux selected from the group consisting of ZnO and PbO.

3. The ceramic-like article of claim 1 wherein said glass includes .5 to 2.0% by weight of at least one flux selected from the group consisting of $Li_2O$, LiF and $CaF_2$.

4. The ceramic-like article of claim 1 wherein the combined weight of $SiO_2$, $Al_2O_3$ and MgO is at least 85.0%.

5. The ceramic-like article of claim 4 wherein said glass also includes 1.0 to 4.5% by weight of at least one flux selected from the group consisting of ZnO, PbO, $Li_2O$, LiF and $CaF_2$.

6. A ceramic-like article produced by the controlled thermal devitrification of a glass consisting essentially of 58.0 to 61.0% by weight $SiO_2$, 15.0 to 20.0% by weight $Al_2O_3$, 8.5 to 11.0% by weight MgO, 1.75 to 3.0% by weight $B_2O_3$, 2.5 to 4.0% by weight $TiO_2$, and 3.5 to 4.0% by weight $ZrO_2$, said article containing alpha-quartz as the major crystalline phase.

7. A method of making a ceramic-like article, having a coefficient of thermal expansion of from $34 \times 10^{-7}/°$ C. to $125 \times 10^{-7}/°$ C. and a modulus of rupture from 30,000 p.s.i. to 180,000 p.s.i., comprising the steps of melting a vitreous composition consisting essentially of 55.0 to 66.0% by weight $SiO_2$, 9.0 to 23.0% by weight $Al_2O_3$, 8.5 to 13.7% by weight MgO, 1.0 to 7.0% by weight $B_2O_3$, 1.0 to 7.0% by weight $TiO_2$, and 2.0 to 5.75% by weight $ZrO_2$, forming an article from said vitreous composition, heating the article to a temperature of between 1700–1900° F. at a rate of 33 to 300° F. per hour and holding said article at said temperature for a period from 15 minutes to two hours to produce alpha quartz as the major crystalline phase.

8. The method of claim 7 wherein said glass includes 1 to 5.0% by weight of at least one flux selected from the group consisting of ZnO, PbO, $Li_2O$, LiF and $CaF_2$.

9. The method of claim 7 wherein the combined weight of $SiO_2$, $Al_2O_3$ and MgO is at least 85.0% by weight.

10. In a method of making a high-strength ceramic-like article having a modulus of rupture of over 100,000 p.s.i., the steps of melting glass batch materials and forming a glass article consisting essentially of 60.61% $SiO_2$, 20.90% $Al_2O_3$, 8.86% MgO, 1.88% $B_2O_3$, 3.65% $ZrO_2$, and 3.95% $TiO_2$, heating said article at a rate of about 100° F. per hour to a temperature of about 1700° F., and holding said article at about 1700° F. for about 2 hours.

11. In a method of making a high-strength ceramic-like article having a coefficient of thermal expansion of about $73.3 \times 10^{-7}$ and a modulus of rupture of about 46,500 p.s.i., the steps of melting glass batch materials and forming a glass article consisting essentially of 63.53% $SiO_2$, 4.86% $B_2O_3$, 3.88% $TiO_2$, 10.85% $Al_2O_3$, 12.97% MgO, and 3.63% $ZrO_2$, heating said glass article at a rate of about 100° F. per hour to a temperature of about 1800° F., and holding said article at 1800° F. for about ½ hour.

References Cited

UNITED STATES PATENTS

| | | | |
|---|---|---|---|
| 3,116,137 | 12/1963 | Yasilos et al. | 106—52 X |
| 3,117,881 | 1/1964 | Henry et al. | 106—39 |
| 3,205,079 | 9/1965 | Stookey | 106—39 |
| 3,252,811 | 5/1966 | Beall | 106—39 |
| 3,380,818 | 4/1968 | Smith | 106—39 X |

HELEN M. McCARTHY, Primary Examiner

W. R. SATTERFIELD, Assistant Examiner

U.S. Cl. X.R.

65—33; 106—53, 54

UNITED STATES PATENT OFFICE
CERTIFICATE OF CORRECTION

Patent No. 3,485,644    Dated December 23, 1969

Inventor(s) Francis Joseph Shonebarger

It is certified that error appears in the above-identified patent and that said Letters Patent are hereby corrected as shown below:

Column 2, Line 28, "$125 \times 10^-/^\circ C.$" should be --$125 \times 10^{-7}/^\circ C.$--

Column 3, Lines 19 and 20, delete "The strengths analyses showed the presence of alpha-quartz."

Column 3, Table I, Example 1, "$73.3 \times 10^{-7}$" should be --$73.3 \times 10^{-7}/^\circ C.$--

Column 3, Table II, "3 1/3" should be --33 1/3--

Column 6, Line 2, "can below" should be --can be below--

Column 6, Table IX, "36.80" should be --63.80--

SIGNED AND
SEALED
JUN 9 1970

(SEAL)
Attest:

Edward M. Fletcher, Jr.
Attesting Officer

WILLIAM E. SCHUYLER, JR.
Commissioner of Patents